(12) United States Patent
Lee et al.

(10) Patent No.: US 10,775,068 B2
(45) Date of Patent: Sep. 15, 2020

(54) SYSTEM AND METHOD FOR MANAGING AIR QUALITY, AND ANALYSIS SERVER

(71) Applicant: COWAY CO., LTD., Chungcheongnam-do (KR)

(72) Inventors: Byong-Hyoek Lee, Seoul (KR); Tae-Hyun Kim, Seoul (KR); Ye-Suk Shin, Seoul (KR); Hyun-Jun Yun, Seoul (KR); Jong-Cheol Kim, Seoul (KR); Sang-Hyeon Kang, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 49 days.

(21) Appl. No.: 16/077,579

(22) PCT Filed: Feb. 17, 2017

(86) PCT No.: PCT/KR2017/001773
§ 371 (c)(1),
(2) Date: Aug. 13, 2018

(87) PCT Pub. No.: WO2017/142346
PCT Pub. Date: Aug. 24, 2017

(65) Prior Publication Data
US 2019/0056138 A1 Feb. 21, 2019

(30) Foreign Application Priority Data
Feb. 17, 2016 (KR) .................. 10-2016-0018324

(51) Int. Cl.
*F24F 11/65* (2018.01)
*G06F 16/904* (2019.01)
*G06F 16/9038* (2019.01)
*B01D 46/00* (2006.01)
*B01D 46/44* (2006.01)
*B01D 46/46* (2006.01)
(Continued)

(52) U.S. Cl.
CPC ............ *F24F 11/65* (2018.01); *G06F 16/904* (2019.01); *G06F 16/9038* (2019.01);
(Continued)

(58) Field of Classification Search
CPC ............ B01D 46/0036; B01D 46/0038; B01D 46/442; B01D 46/448; B01D 46/46;
(Continued)

(56) References Cited

U.S. PATENT DOCUMENTS 4,437,608 A * 3/1984 Smith .................. F24F 11/0001
236/13
9,182,751 B1 * 11/2015 Reeder ................. G01N 33/004
(Continued)

FOREIGN PATENT DOCUMENTS

CN 1781577 A * 11/2004
EP 2527755 11/2012
(Continued)

OTHER PUBLICATIONS

International Search Report for PCT/KR2017/001773 dated Apr. 20, 2017, 4 pages.

*Primary Examiner* — Ziaul Karim
(74) *Attorney, Agent, or Firm* — Dority & Manning, P.A.

(57) ABSTRACT

A system and a method for managing an air quality, and an analysis server are provided. The system for managing an air quality includes an air cleaner for measuring the quality of ambient air, transmitting air quality measurement data, and controlling at least one of an air cleaning function, a dehumidification function, and a humidification function on the basis of a received solution; and an analysis server for analyzing the air quality measurement data, received from the air cleaner, to derive an air quality type and providing, to the air cleaner, the predefined solution, according to the derived air quality type.

16 Claims, 5 Drawing Sheets

(51) Int. Cl.
  *F24F 110/20* (2018.01)
  *F24F 110/64* (2018.01)
  *F24F 110/70* (2018.01)
  *F24F 11/30* (2018.01)
  *F24F 110/10* (2018.01)

(52) U.S. Cl.
  CPC ...... *B01D 46/0036* (2013.01); *B01D 46/0038* (2013.01); *B01D 46/442* (2013.01); *B01D 46/448* (2013.01); *B01D 46/46* (2013.01); *F24F 11/30* (2018.01); *F24F 2110/10* (2018.01); *F24F 2110/20* (2018.01); *F24F 2110/64* (2018.01); *F24F 2110/70* (2018.01)

(58) Field of Classification Search
  CPC ........ F24F 11/30; F24F 11/65; F24F 2110/10; F24F 2110/20; F24F 2110/64; F24F 2110/70; G06F 16/904; G06F 16/9038
  See application file for complete search history.

(56) References Cited

U.S. PATENT DOCUMENTS

| | | | | |
|---|---|---|---|---|
| 2002/0144537 A1* | 10/2002 | Sharp | ........................ | G01N 1/26 73/31.01 |
| 2008/0077331 A1* | 3/2008 | Lewis | ................ | G01N 33/0031 702/30 |
| 2013/0174646 A1* | 7/2013 | Martin | ..................... | F24F 11/30 73/31.02 |
| 2015/0345814 A1* | 12/2015 | Nakano | .................. | G05B 15/02 700/276 |
| 2016/0146769 A1* | 5/2016 | Zhang | ................ | G01N 33/0063 73/31.02 |
| 2017/0010015 A1* | 1/2017 | Jan | ........................ | F24F 3/1411 |
| 2017/0193788 A1 | 7/2017 | Kim et al. | | |

FOREIGN PATENT DOCUMENTS

| | | |
|---|---|---|
| JP | H06148107 | 5/1994 |
| JP | 2005003313 | 1/2005 |
| JP | 2005009823 | 1/2005 |
| JP | 2005337647 | 12/2005 |
| JP | 2008082661 | 4/2008 |
| JP | 2012247078 | 12/2012 |
| JP | 2014142164 | 8/2014 |
| JP | 2014206291 | 10/2014 |
| JP | 2015152175 | 8/2015 |
| KR | 101517332 | 2/2015 |
| KR | 101532174 | 6/2015 |
| KR | 101591735 | 2/2016 |

* cited by examiner

[FIG. 1]
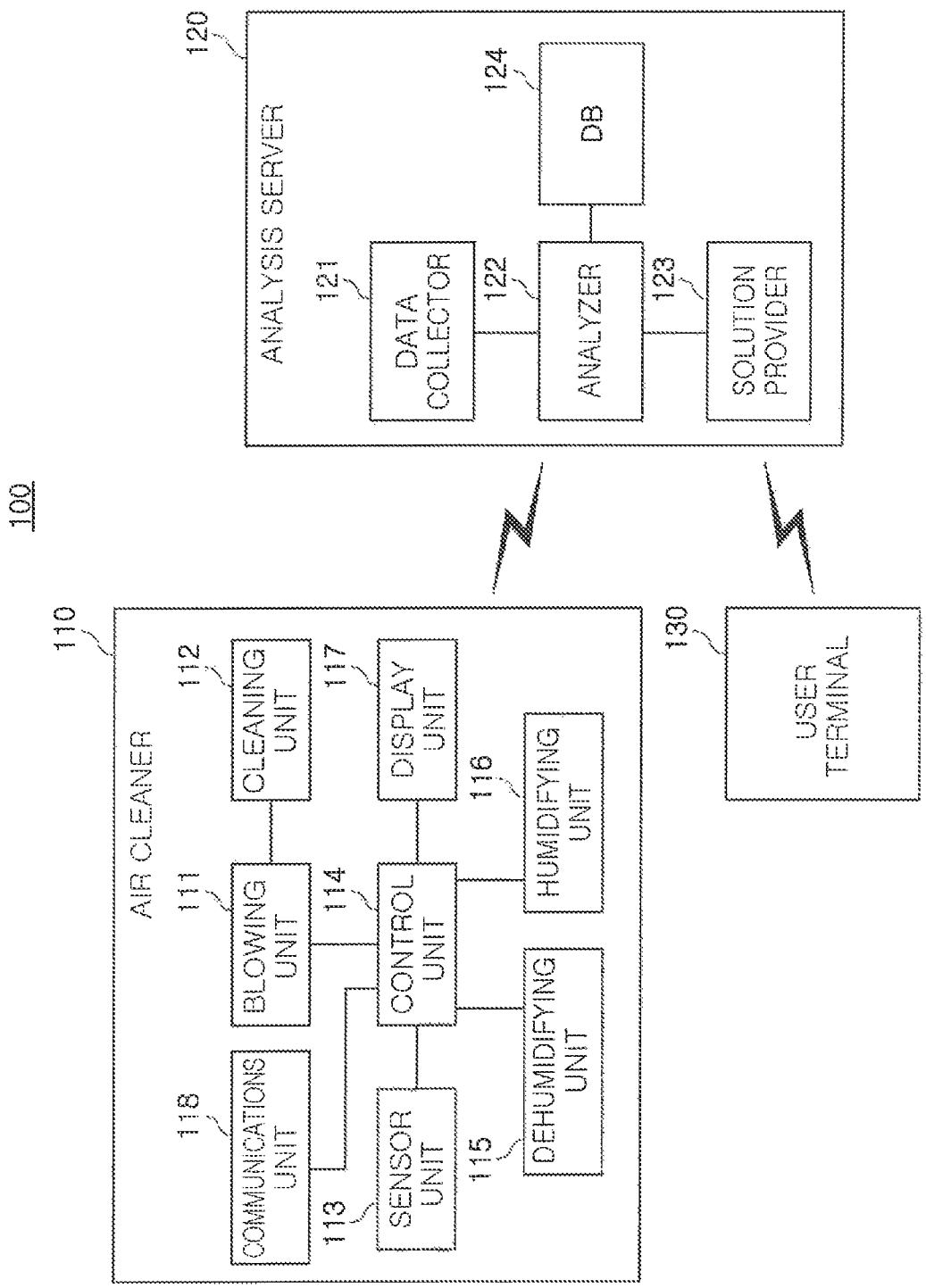

[FIG. 2]
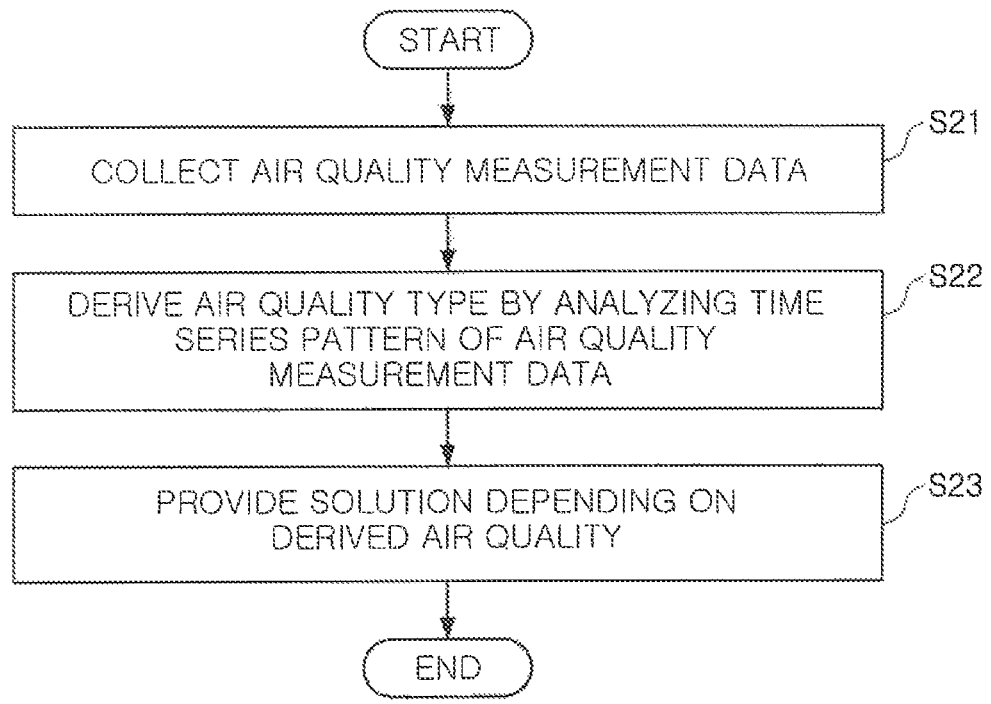

[FIG. 3]
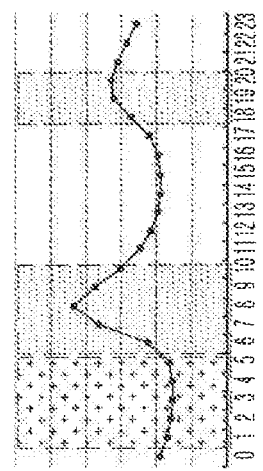
(a)
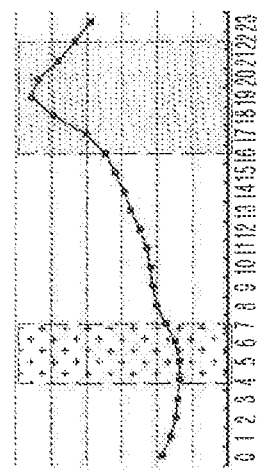
(b)
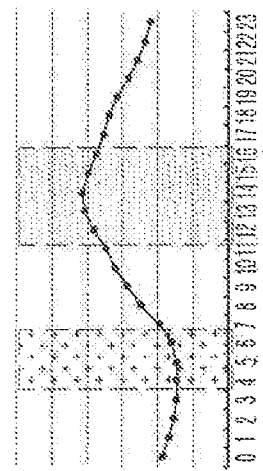
(c)
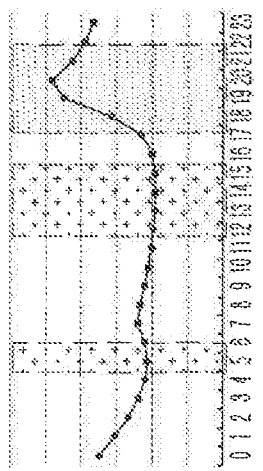
(d)
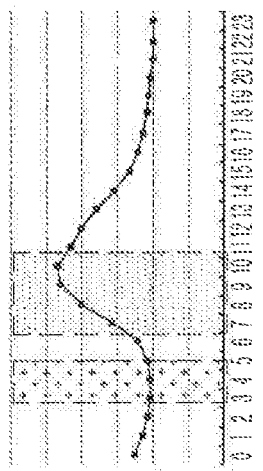
(e)
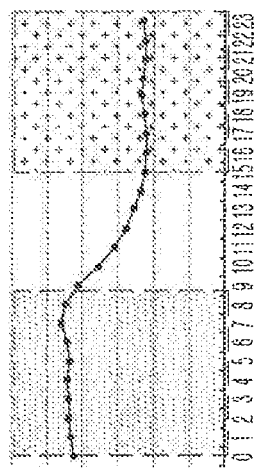
(f)

[FIG. 4]
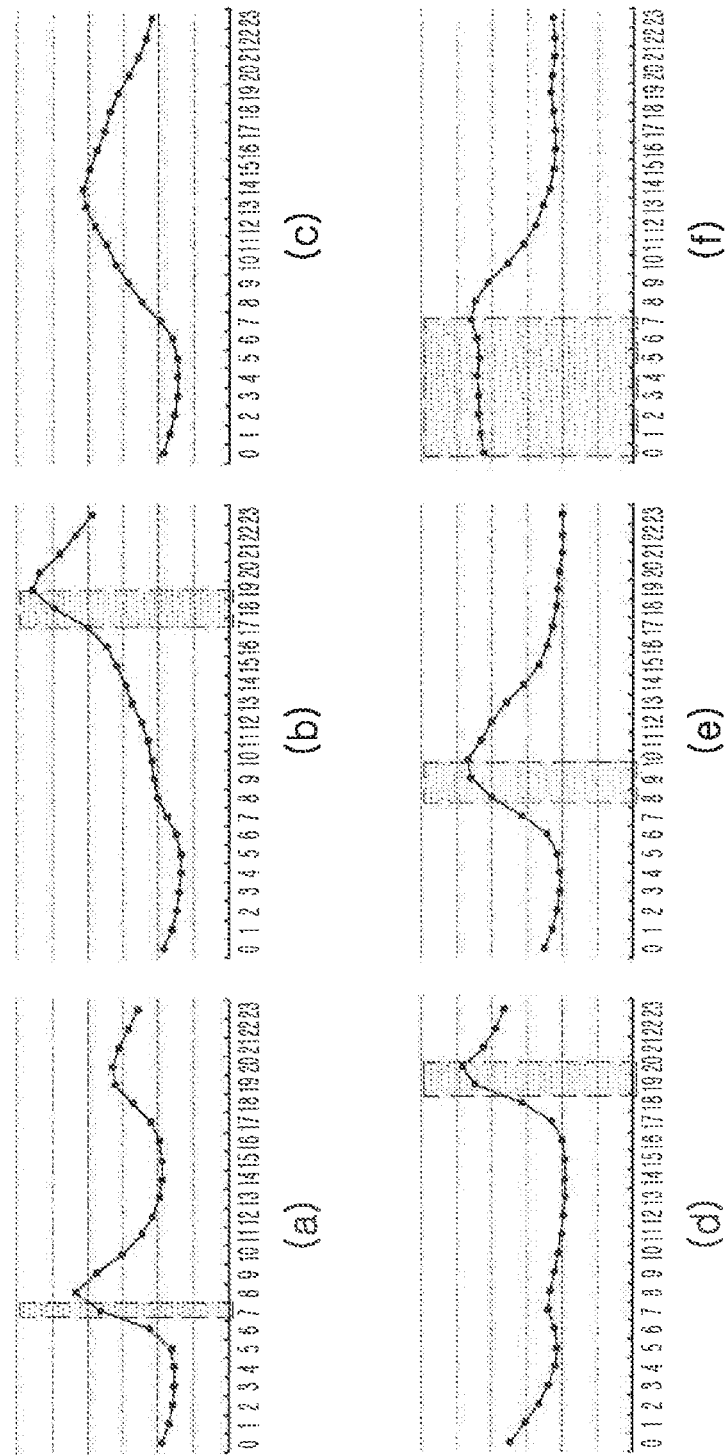

[FIG. 5]
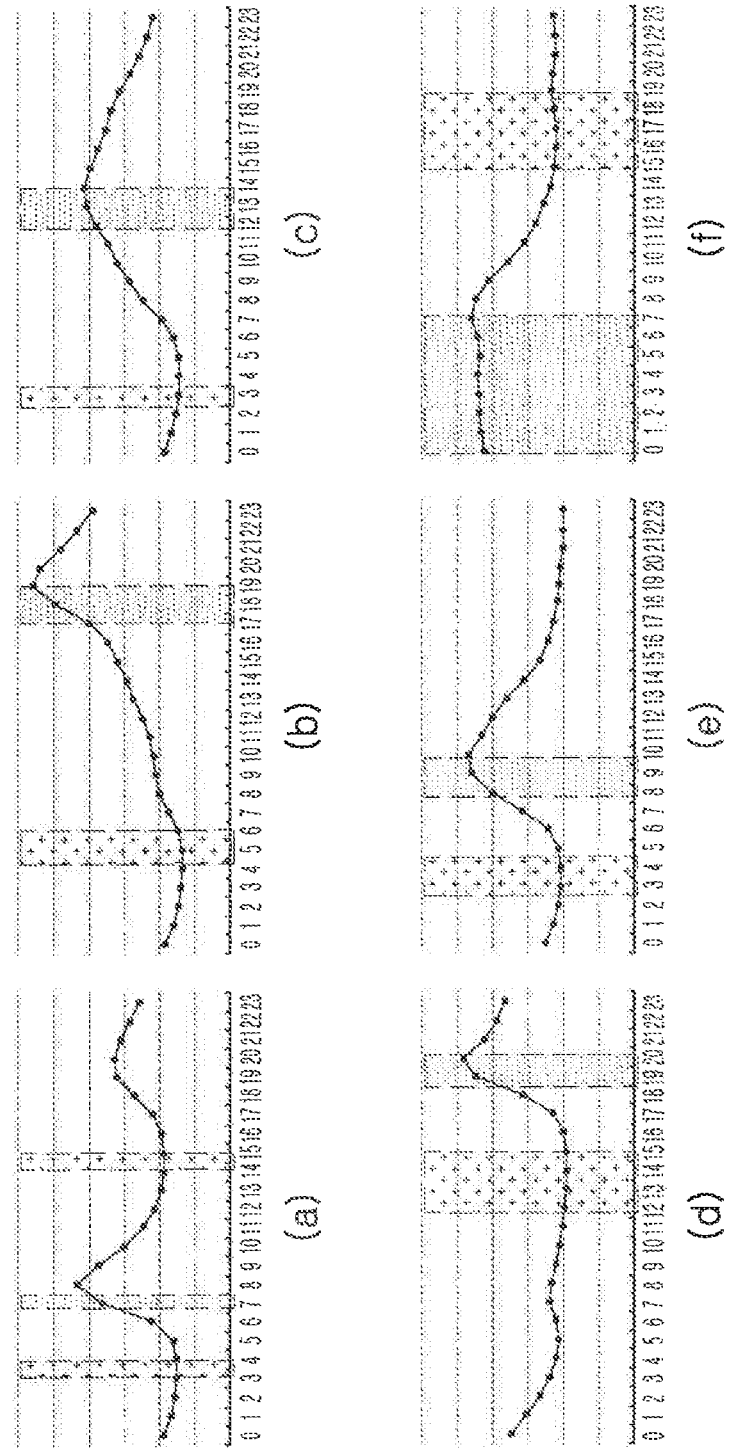

SYSTEM AND METHOD FOR MANAGING AIR QUALITY, AND ANALYSIS SERVER

CROSS REFERENCE TO RELATED APPLICATIONS

This application is the U.S. National Stage entry of International Application Number PCT/KR2017/001773 filed under the Patent Cooperation Treaty having a filing date of Feb. 17, 2017, which claims priority to Korean Patent Application Serial Number 10-2016-0018324 having a filing date of Feb. 17, 2016, which are incorporated herein by reference.

TECHNICAL FIELD

The present disclosure relates to a system and a method for managing air quality, and an analysis server.

BACKGROUND ART

Air cleaners remove contaminants contained in air, to generate fresh air. Such air cleaners have been provided with various types of sensors, and have been released as products with dehumidification or humidification functions, in addition to an air cleaning function.

In general, air cleaners may operate manually in response to input signals input by users, or may operate automatically, according to preset schemes by processors mounted on the air cleaners.

However, in the case of operating manually, there may be difficulty in that users should be able to accurately grasp air quality in real time and select appropriate operation methods accordingly. Further, even when air cleaners operate automatically, since air cleaners operate depending on the same reference, regardless of the air quality in spaces in which the air cleaners are installed, there are limits to efficient improvements of different air qualities for respective spaces in which air cleaners are installed.

DISCLOSURE

Technical Problem

An aspect of the present disclosure is to provide a scheme for efficiently managing air quality, by controlling an operation of an air cleaner, based on an air quality of a space in which the air cleaner is installed.

Technical Solution

An aspect of the present disclosure is to provide a system for managing air quality.

According to an aspect of the present disclosure, a system for managing air quality includes an air cleaner measuring a quality of ambient air to transmit air quality measurement data, and controlling at least one of an air cleaning function, a dehumidification function and a humidification function, based on a received solution; and an analysis server analyzing the air quality measurement data received from the air cleaner to derive an air quality type, and providing the solution, predefined, based on the derived air quality type, to the air cleaner.

Another aspect of the present disclosure is to provide a method of managing air quality.

According to another aspect of the present disclosure, a method of managing air quality includes collecting a plurality of pieces of air quality measurement data measured, for a predetermined period of time, by an air cleaner; deriving an air quality type by analyzing a time series pattern of the plurality of pieces of air quality measurement data; and providing a predefined solution to the air cleaner, depending on the derived air quality type.

Another aspect of the present disclosure is to provide an analysis server.

According to another aspect of the present disclosure, an analysis server includes a data collector communicating with an air cleaner to collect air quality measurement data; an analyzer, analyzing the air quality measurement data to derive an air quality type; a database storing predefined solutions with respect to a plurality of preclassified air quality types; and a solution provider searching the database for a predefined solution corresponding to the air quality type derived by the analyzer, and providing the searched solution to the air cleaner.

Further, the above-described technical solutions to the technical problems are not all of the features of the present disclosure. Various features of the present disclosure and advantages and effects thereof will be more fully understood by reference to the following detailed exemplary embodiments.

Advantageous Effects

According to an exemplary embodiment, air quality may be efficiently managed by providing a customized solution, based on the air quality, in a space in which an air cleaner is installed.

DESCRIPTION OF DRAWINGS

FIG. 1 is a block diagram of a system for managing air quality according to an exemplary embodiment in the present disclosure.

FIG. 2 is a flowchart of a method of managing air quality according to another exemplary embodiment in the present disclosure.

FIGS. 3 to 5 are drawings illustrating examples of solutions of a plurality of air quality types classified according to an exemplary embodiment in the present disclosure, and examples of customized solutions for respective types.

BEST MODE FOR INVENTION

Hereinafter, exemplary embodiments of the present disclosure will be described as follows with reference to the accompanying drawings, so that those skilled in the art can easily carry out the present disclosure. In the following detailed description of the exemplary embodiments, a detailed description of known functions and configurations incorporated herein will be omitted when it may render the subject matter of the present invention rather unclear. Further, the same reference numerals refer to like parts having like functions and operations throughout the drawings.

Throughout the specification, it will be understood that when a part is referred to as being 'connected to' another part, it can be directly 'connected to' or 'indirectly connected to' with another part intervening therebetween. It will be further understood that the terms 'comprising' and/or 'including' any other components mean that other components may be included, rather than excluding other components, unless specifically stated otherwise.

FIG. 1 is a block diagram of a system for managing air quality according to an exemplary embodiment.

Referring to FIG. 1, a system 100 for managing air quality according to an exemplary embodiment may include an air cleaner 110, an analysis server 120, and a user terminal 130.

The air cleaner 110 may include a blowing unit 111, a cleaning unit 112, a sensor unit 113, a control unit 114, a dehumidifying unit 115, a humidifying unit 116, a display unit 117, and a communications unit 118, to measure an ambient air quality and provide the measured air quality data to the analysis server 120 to be described later, and to automatically control at least one of an air cleaning function, a dehumidification function and a humidification function, based on the data received from the analysis server 120.

The blowing unit 111 may form an air flow, to allow external air to flow into the air cleaner 110, and may include a blowing fan and a motor for driving the blowing fan.

In this case, the blowing fan may rotate by the motor to form an air flow. In addition, a rotation speed of the motor, for example, revolutions per minute (RPM) thereof, may be adjusted by a control signal received from the control unit 114.

The cleaning unit 112 may be provided to filter pollutants contained in air flowing into the air cleaner 110, and for example, may remove pollutants, using a method of adsorbing pollutants in the air flowing into the air cleaner 110, and the like.

For example, the cleaning unit 112 may be comprised of one or more filters, and may be located in an air inlet of the air cleaner 110, or may be located in an air inlet and an air outlet of the air cleaner 110, respectively. In this case, examples of one or more filters may include various types of filters, such as a prefilter, a functional filter, a high efficiency particulate air (HEPA) filter, a deodorization filter, and the like. In this case, further, the prefilter may be provided to remove relatively large dust particles, hair, pet hair, and the like, the functional filter may be to remove pollen, house dust mites, viruses, bacteria, and the like, while having an antibacterial function, the HEPA filter is to remove various microorganisms, such as fine dust mites and indoor mold spores, and the like, and the deodorization filter is to remove various indoor odors, harmful gases, and the like.

The sensor unit 113 may be provided to measure an air quality around the air cleaner 110. For example, the sensor unit 113 may be configured to include various types of sensors capable of measuring an air state, such as a dust sensor measuring a concentration of dust in the air, a carbon dioxide sensor measuring a concentration of carbon dioxide in the air, a gas sensor measuring a gas concentration in the air, a radon sensor measuring a radon concentration in the air, a temperature sensor measuring an ambient air temperature, and a humidity sensor measuring humidity of surrounding air, and the like.

FIG. 1 illustrates that the sensor unit 113 is included in the air cleaner 110, but the configuration of the sensor unit 113 is not limited thereto. For example, the sensor unit 113 may be implemented as a separate sensing device, to be separated from the air cleaner 110.

The control unit 114 may be provided to control general operations of the air cleaner 110. For example, the control unit 114 may be implemented by a processor such as a central processing unit (CPU), a graphics processing unit (GPU), a microprocessor, an application specific integrated circuit (ASIC), field programmable gate arrays (FPGA), and the like.

According to an exemplary embodiment, the control unit 114 may perform controlling to transmit air quality measurement data, measured by the sensor unit 113, to the analysis server 120, and may control an operation of at least one of the blowing unit 111, the dehumidifying unit 115 and the humidifying unit 116, based on data received from the analysis server 120, for example, a control method previously defined according to the type of an air quality.

The dehumidifying unit 115 may be provided to remove moisture contained in air flowing into the air cleaner 110. For example, the dehumidifying unit 115 may remove moisture in air, using a refrigeration cycle of a compressor, a condenser, and a heat exchanger, but an exemplary embodiment thereof is not necessarily limited thereto. For example, the dehumidifying unit 115 may remove moisture contained in air by various methods known in the art.

The humidifying unit 116 may be provided to supply moisture to the air flowing into the air cleaner 110. For example, the humidifying unit 116 may supply moisture to the air in a natural vaporization manner, but an exemplary embodiment thereof is not necessarily limited thereto. The humidifying unit 116 may supply moisture to air by various methods known in the art.

The display unit 117 may be provided to display various kinds of information related to operations of the air cleaner 110. For example, the air quality measurement data measured by the sensor unit 113 may be displayed via the display unit 117, or a solution proposed, based on air quality type or air quality-type information derived by the analysis server 120, may be displayed via the display unit, to then be provided to a user.

The communications unit 118 may be provided to perform communications with the analysis server 120, and may be implemented by various wireless communications technologies known in the art, for example, Wi-Fi, Zigbee®, or the like.

The analysis server 120 may analyze the air quality measurement data received from the air cleaner 110 to derive an air quality type, and may provide a customized solution according to the derived air quality type. The analysis server 120 may be configured to include a data collector 121, an analyzer 122, a solution provider 123, and a DB 124.

The data collector 121 may collect air quality measurement data by performing communications with the air cleaner 110.

The analyzer 122 may analyze the air quality measurement data collected by the data collector 121, to derive an air quality type.

In detail, the analyzer 122 may derive an air quality type by analyzing a time series pattern of a plurality of pieces of air quality measurement data measured for a predetermined period of time. For example, the analyzer 122 may classify air quality types, by analyzing time series patterns of measurement data with respect to respective types of air quality measurement data, for example, for a dust concentration, a carbon dioxide concentration, temperature, humidity, and the like.

To this end, the analyzer 122 may determine the air quality type by determining whether the time series pattern of the collected air quality measurement data is similar to any of the time series patterns of the plurality of preclassified air quality types. In this case, the plurality of preclassified air quality types may be obtained by analyzing a large amount of data, measured in a plurality of households in advance, to classify households representing patterns in which time series patterns of air quality measurement data are similar, and by analyzing and classifying air quality characteristics of a relevant household. In addition, solutions such as a control method of the air cleaner, a ventilation method, a customized filter and the like, to efficiently improve air quality for respective classified air quality types, may be predefined, and may be stored in the DB 124. For example, the control method of the air cleaner may include operations of controlling an operating time and air volume of an air cleaning function, an operating time and air volume of a humidification function or a dehumidification function, and the like.

FIGS. 3 to 5 are drawings illustrating examples of solutions of a plurality of air quality types classified according to an exemplary embodiment and examples of customized solutions for respective types. In addition, FIG. 3 illustrates air quality types classified according to time-series patterns of dust concentrations, FIG. 4 illustrates air quality types classified according to time-series patterns of carbon dioxide concentrations, and FIG. 5 illustrates air quality types classified according to time-series patterns of humidity.

As illustrated in FIG. 3, the air quality types may be classified into types (a) to (f) according to the time series patterns of dust concentrations. In graphs (a) to (f), illustrated in FIG. 3, horizontal axes represent time and vertical, axes represent fine dust concentrations.

For example, when the air quality type is classified as illustrated in FIG. 3, a dust concentration may start to increase in a time series pattern of dust concentrations for each air quality type, and when the dust concentration reaches a predetermined first reference value or more, the air cleaner may operate by increasing an air amount of the air cleaner, for example, in a turbo operating mode in a region illustrated as dots in FIG. 3. Then, when the dust concentration begins to decrease and falls below a predetermined second reference value, the air amount of the air cleaner may be returned to the previous level. In this case, the first reference value may be set to be lower than the second reference value.

On the other hand, when the dust concentration starts to decrease and falls below a predetermined third reference value in the time series pattern of the dust concentrations for each air quality type, the air cleaner may operate to decrease the air amount of the air cleaner, for example, in a standby mode in a region indicated by a cross in FIG. 3. Then, when the air concentration of the air cleaner starts to increase and reaches a predetermined fourth reference value or more, the air amount of the air cleaner may be returned to the previous level. In this case, the third reference value may be set to be lower than the fourth reference value.

Further, as illustrated in FIG. 4, the air quality type may be classified into types (a) to (f) according to time-series patterns of carbon dioxide concentrations. In respective graphs (a) to (f) illustrated in FIG. 4, a horizontal axis represents time and a vertical axis represents a concentration of carbon dioxide.

In the case in which the air quality type is classified as illustrated in FIG. 4, when a concentration of carbon dioxide begins to increase and reaches a predetermined fifth reference value or more in a time-series pattern of carbon dioxide concentrations for each air quality type, a user may be notified of ventilation, or ventilation air volume may be increased. In this case, a recommended ventilation time, or a time to increase a ventilation air volume of an air conditioner or a ventilation device, may be set, from a point in time at which a carbon dioxide concentration reaches the fifth reference value or more, to a point in time at which the carbon dioxide concentration starts to decrease, for example, in a region indicated by dots in FIG. 4, but is not necessarily limited thereto, and may be set to be suitable for the characteristics of each air quality type.

In addition, as illustrated in FIG. 5, the air quality types may be classified into types (a) to (f) according to a time-series pattern of humidity. In graphs (a) to (f) illustrated in FIG. 5, a horizontal axis represents time and a vertical axis represents humidity.

For example, when the air quality type is classified as shown in FIG. 5, the humidity starts to increase and reaches a predetermined sixth reference value or more in a time series pattern of humidity for each air quality type, a dehumidification function may be activated, for example, in a region indicated by dots in FIG. 5. Then, when the humidity level begins to decrease, the dehumidification function may be stopped.

On the other hand, when the humidity begins to decrease and falls below a predetermined seventh reference value in the time series pattern of humidity for each air quality type, a humidification function may be activated, for example, in a region indicated by a cross in FIG. 5. Then, when the humidity begins to increase, the humidification function may be stopped.

In addition, in a time-series pattern of temperatures by season, a cooling device operation schedule may also be set in a relatively high temperature period, for example, within an upper 20%, and a heating device operation schedule may be set in a relatively low temperature period, for example, within a lower 20%.

The plurality of air quality types illustrated in FIGS. 3 to 5 are only provided by way of example to describe the exemplary embodiments in the present disclosure, and thus, the time series patterns, types, and the like of the air quality types for respective pollution sources are not limited to those described above.

The solution provider 123 may be to provide a customized solution to the air cleaner 110 or the user terminal 130, depending on the type of an air quality derived by the analyzer 122.

For example, the solution provider 123 may provide data regarding a control method of the air cleaner, among solutions predefined in the DB 124 depending on the type of air quality derived by the analyzer 122, to the air cleaner 110, thereby allowing the air cleaner 110 to automatically operate thereby, and may provide information regarding a ventilation method or a customized filter to the air cleaner 110 or the user terminal 130, such that a user may take an appropriate action accordingly.

In addition, the solution provider 123 may provide data regarding a control method of the air conditioner or the ventilation device and a control method of a cooling device or a heating device, among the solutions defined in the DB 124, to a device corresponding thereto, thereby automatically controlling operations of various devices influencing air quality.

Further, the solution provider 123 may also provide a customized solution depending on the type of obtained air quality, by additionally considering environmental characteristics, for example, a measurement range and an average value of air quality measurement data, outdoor air quality measurement data, or the like, provided in a space in which the air cleaner 110 is installed, or seasonal characteristics, for example, a seasonal average temperature, humidity, and the like, at a point in time at which the solution is provided. For example, the solution provider 123 may adjust reference values, the first to seventh reference values described above, at the time of proposing a control method or ventilation of the air cleaner in consideration of the environmental characteristics or seasonal characteristics described above, thereby providing a solution suitable for a user.

The analysis server 120 described above may be implemented by a computing device, with a distributed computing environment or the like, including any of the above-described systems or devices, a personal computer, a server computer, a handheld or laptop device, a mobile device such as a mobile phone, a personal digital assistant (PDA), a media player and the like, a multiprocessor system, a consumer electronic device, a minicomputer, or a mainframe computer.

The user terminal 130 may receive a customized solution, based on the type of air quality derived from the analysis server 120, and may provide the solution to a user through a display or the like. For example, the user terminal 130 may be implemented as a portable terminal, a tablet PC, or the like, having an input/output function and a communications function.

FIG. 2 is a flowchart of a method of managing air quality according to another exemplary embodiment in the present disclosure.

Referring to FIG. 2, first, air quality measurement data measured for a predetermined period of time may be collected in S21, a time series pattern of the collected air quality measurement data may be analyzed to derive an air quality type in S22, and then, a customized solution, based on the derived air quality type, may be provided to a user in S23.

The detailed descriptions of respective operations are the same as those described above with reference to FIG. 1, and thus, a detailed description thereof will be omitted. In addition, the method of managing air quality described above may be performed by the system for managing air quality illustrated in FIG. 1.

The present disclosure is not limited to the foregoing exemplary embodiments and the accompanying drawings. While exemplary embodiments have been shown and described above, it will be apparent to those skilled in the art that modifications and variations could be made without departing from the scope of the present disclosure as defined by the appended claims.

The invention claimed is:

1. A system for managing air quality, comprising: an air cleaner configured to measure a quality of ambient air to transmit air quality measurement data in a space in which the air cleaner is installed, and to control at least one of an air cleaning function, a dehumidification function and a humidification function, based on a received customized solution for managing the quality of the space; and an analysis server configured to analyze the air quality measurement data received from the air cleaner to derive an air quality type, and to provide the customized solution based on the derived air quality type, to the air cleaner, wherein the customized solution includes a control method of the air cleaner corresponding to respective classified air quality types;
wherein the air cleaner includes:
a sensor device configured to measure the quality of ambient air;
a communication device configured to transmit the air quality measurement data to the analysis server;
a blowing device configured to allow external air to flow into the air cleaner; and
a display device configured to display information related to operations of the air cleaner,
wherein the air cleaner further includes at least one of a cleaning device, a dehumidifying device, and humidifying device,
wherein the cleaning device filters pollutants contained in air flowing into the air cleaner,
wherein the dehumidifying device removes moisture contained in the air flowing into the air cleaner, and
wherein the humidifying device supplies moisture to the air flowing into the air cleaner.

2. The system for managing air quality of claim 1, wherein the analysis server is implemented by a computing device, wherein the analysis server comprises:
a data collector, of the computing device, communicating with the air cleaner, to collect the air quality measurement data;
an analyzer, of the computing device, analyzing the air quality measurement data to derive the air quality type;
a database storing the customized solution with respect to a plurality of preclassified air quality types; and
a solution provider, of the computing device, searching the database for the customized solution corresponding to the air quality type derived by the analyzer, and providing the customized solution to the air cleaner.

3. The system for managing air quality of claim 2, wherein the analyzer, of the computing device, analyzes whether a time series pattern of a plurality of pieces of air quality measurement data measured for a predetermined period of time is similar to a time series pattern of the plurality of the preclassified air quality types, to derive the air quality type.

4. The system for managing air quality of claim 2, wherein the customized solution comprises at least one of a ventilation method and a customized filter, defined for each air quality type.

5. The system for managing air quality of claim 4, wherein the control method of the air cleaner comprises:
a control method of operating the air cleaner by increasing an air amount of the air cleaner when a dust concentration starts to increase and reaches a predetermined first reference value or higher in a time series pattern of dust concentrations for each air quality type, and then, returning the air amount of the air cleaner to a previous state when the dust concentration starts to decrease and falls below a predetermined second reference value; and
a control method of operating the air cleaner by decreasing an air amount of the air cleaner when the dust concentration starts to decrease and falls below a predetermined third reference value in the time series pattern of the dust concentrations, and then, returning the air amount of the air cleaner to a previous state when the dust concentration starts to increase and reaches a predetermined fourth reference value or higher.

6. The system for managing air quality of claim 4, wherein the control method of the air cleaner comprises:
a control method of activating a dehumidification function when a humidity level starts to increase and reaches a predetermined sixth reference value or higher in a time series pattern of humidity for each air quality type, and then, stopping the dehumidification function when the humidity level starts to decrease; and
a control method of activating a humidification function when the humidity level starts to decrease and falls below a predetermined seventh reference value in the time series pattern of the humidity, and then, stopping the humidification function when the humidity level starts to increase.

7. The system for managing air quality of claim 4, wherein the ventilation method comprises a ventilation notification, from a point in time at which a carbon dioxide concentration starts to increase and reaches a predetermined fifth reference value or higher, to a point in time at which the carbon dioxide concentration starts to decrease, in a time series pattern of carbon dioxide concentrations for each air quality type.

8. The system for managing air quality of claim 4, wherein the customized solution further comprises at least one of a control method of an air conditioner or a ventilation device, a control method of a cooling device, and a control method of a heating device, defined for each air quality type.

9. The system for managing air quality of claim 8, wherein the control method of the air conditioner or the ventilation device comprises a control method of increasing an air volume of the air conditioner or the ventilation device, from a point in time at which a carbon dioxide concentration starts to increase and reaches a predetermined fifth reference value or higher, to a point in time at which the carbon dioxide concentration starts to decrease, in a time series pattern of carbon dioxide concentrations for each air quality type.

10. The system for managing air quality of claim 8, wherein the control method of the cooling device comprises a control method of operating the cooling device at a point in time at which a temperature is included within a predetermined upper ratio in a time-series pattern of seasonal temperatures, and the control method of the heating device comprises a control method of operating the heating device at a point in time at which the temperature is included within a predetermined lower ratio in a time-series pattern of the seasonal temperatures.

11. The system for managing air quality of claim 2, further comprising a user terminal receiving the solution from the analysis server to display the solution, wherein the solution provider, of the computing device, provides the customized solution corresponding to the air quality type derived by the analyzer, to the user terminal.

12. A method of managing air quality, comprising: collecting a plurality of pieces of air quality measurement data measured, for a predetermined period of time, by an air cleaner through a wireless communication; deriving an air quality type by analyzing a time series pattern of the plurality of pieces of air quality measurement data; and providing a customized solution to the air cleaner, depending on the derived air quality type for managing a quality of a space in which the air cleaner is installed, wherein the customized solution includes a control method of the air cleaner corresponding to respective classified air quality types;

wherein the air cleaner includes:
a sensor device configured to measure the quality of ambient air;
a communication device configured to transmit the air quality measurement data to the analysis server;
a blowing device configured to allow external air to flow into the air cleaner; and
a display device configured to display information related to operations of the air cleaner,
wherein the air cleaner further includes at least one of a cleaning device, a dehumidifying device, and humidifying device,
wherein the cleaning device filters pollutants contained in air flowing into the air cleaner,
wherein the dehumidifying device removes moisture contained in the air flowing into the air cleaner, and
wherein the humidifying device supplies moisture to the air flowing into the air cleaner.

13. The method of managing air quality of claim 12, wherein the deriving of the air quality type is performed by analyzing whether a time series pattern of the plurality of pieces of air quality measurement data is similar to a time series pattern of a plurality of preclassified air quality types.

14. The method of managing air quality of claim 12, wherein the customized solution comprises at least one of a ventilation method and a customized filter, defined for each air quality type.

15. The method of managing air quality of claim 14, wherein the customized solution further comprises at least one of a control method of an air conditioner or a ventilation device, a control method of a cooling device and a control method of a heating device, defined for each air quality type.

16. The method of managing air quality of claim 12, further comprising providing the customized solution to a user terminal, depending on the derived air quality type.

* * * * *